United States Patent [19]

Wilson et al.

[11] Patent Number: 4,836,768

[45] Date of Patent: Jun. 6, 1989

[54] COATED SUBSTRATES

[75] Inventors: Alan D. Wilson, Liphook; Havard J. Prosser, Royston; Anthony J. Dunsdon, Thornton Heath; John C. Skinner, Hounslow; Pauline J. Brookman, Bordon, all of England

[73] Assignee: National Research Development Corporation, England

[21] Appl. No.: 39,113

[22] Filed: Apr. 15, 1987

Related U.S. Application Data

[63] Continuation of Ser. No. 791,329, Oct. 25, 1985, abandoned.

[30] Foreign Application Priority Data

Oct. 26, 1984 [GB] United Kingdom ............... 8427138

[51] Int. Cl.$^4$ .............. B32B 15/00; B32B 15/08; B32B 27/06; C04B 9/02
[52] U.S. Cl. .................. 428/323; 428/328; 428/461; 428/463; 428/500; 428/522; 428/704; 428/325; 106/14.14; 106/14.12; 106/14.44; 106/14.21
[58] Field of Search ............... 428/325, 328, 323, 461, 428/704, 500, 463; 106/14.05, 14.12–14.15, 14.18, 14.21, 14.44

[56] References Cited

U.S. PATENT DOCUMENTS

| | | | |
|---|---|---|---|
| 2,760,886 | 8/1956 | Prentiss et al. | 428/461 |
| 3,577,274 | 5/1971 | Taylor et al. | 428/562 |
| 3,941,609 | 3/1976 | Stern | 106/14.44 |
| 4,066,598 | 1/1978 | Beers et al. | 524/440 |
| 4,111,884 | 9/1978 | Takase et al. | 524/405 |
| 4,234,653 | 11/1980 | Ballard et al. | 428/328 |
| 4,400,413 | 8/1983 | Emmons et al. | 427/407.1 X |
| 4,459,335 | 7/1984 | Tanaka et al. | 428/328 |
| 4,561,896 | 12/1985 | Drake et al. | 106/14.44 |

FOREIGN PATENT DOCUMENTS

| | | |
|---|---|---|
| 586132 | 9/1947 | United Kingdom . |
| 947754 | 5/1964 | United Kingdom . |
| 949782 | 8/1964 | United Kingdom . |
| 1103832 | 8/1968 | United Kingdom . |
| 1121615 | 9/1968 | United Kingdom . |
| 1164434 | 8/1969 | United Kingdom . |
| 1189436 | 1/1970 | United Kingdom . |
| 1199885 | 5/1970 | United Kingdom . |
| 1189823 | 6/1970 | United Kingdom . |
| 1233080 | 5/1971 | United Kingdom . |
| 1419164 | 3/1975 | United Kingdom . |
| 1453940 | 1/1976 | United Kingdom . |
| 1484454 | 9/1977 | United Kingdom . |
| 1498820 | 1/1978 | United Kingdom . |
| 1528715 | 1/1978 | United Kingdom . |
| 1504520 | 3/1978 | United Kingdom . |
| 1528717 | 4/1978 | United Kingdom . |
| 2017736 | 6/1979 | United Kingdom . |
| 1588976 | 6/1981 | United Kingdom . |

OTHER PUBLICATIONS

T. L. P. Watts et al, J. Oral Rehabiliatation, 10, pp. 393–398, Oct. (1983).
Alan D. Wilson et al "Aluminosilicate Glasses for Polyelectrolyte Cements" Ind Eng Chem Prod Res Dev, Sep. 1980, 19, 263–270.

*Primary Examiner*—Ellis P. Robinson
*Assistant Examiner*—Susan S. Rucker
*Attorney, Agent, or Firm*—Jacobs & Jacobs

[57] ABSTRACT

A body having a substrate surface which comprises corrodible material and on which substrate surface is present a coherent protective layer of an anti-corrosion composition which comprises a solid matrix of electrical conductivity $\geq 10^{-6}$ mho cm$^{-1}$ and formed by reaction between at least water-soluble Bronsted acid and at least one Lewis base in which matrix is incorporated an elemental metal, or an alloy thereof, the matrix and metal being effective in service as electrolyte and sacrificial anode, respectively.

15 Claims, No Drawings

COATED SUBSTRATES

CROSS-REFERENCE

This is a continuation of Ser. No. 791,329, filed Oct. 25, 1985, now abandoned.

This invention relates to coated substrates; more particularly, this invention relates to substrates which are coated and thereby protected from corrosive fluid media; to coating compositions therefor; and to processes for coating substrates with such coating compositions.

There are considerable problems in economically protecting bodies, particularly structural bodies, in contact with aqueous media from corrosion. This is particularly the case wherein the bodies comprise steel and the contacting medium is sea water. Such marine structural bodies (which include sea-based oil rigs; wet and dry docks; piers and ships) can be afforded some cathodic protection below the sea line either by applying thereto a positive electric potential or by, in effect, incorporating them in a galvanic cell which also comprises sacrificial anodes, typically of aluminum, magnesium or zinc, and sea water, as electrolyte. However, above the sea line, especially in the so-called "splash zone" where not only does the water level rise and fall but also the corrosion process seems at its most vigorous, this expedient is not available and it is necessary to resort to coating this region of the structural body, an expensive procedure. Moreover, such structural bodies are liable to mechanical damage, for example by accidental collision; in consequence of this, the integrity of such coatings is put at risk. Furthermore, the surfaces of structural bodies in the splash zone are necessarily intermittently wet and cannot be coated with currently available, hydrophobic protective paints.

This invention seeks to provide a coating which will overcome or minimise the aforesaid problems.

Accordingly, the present invention provides a body having a corrosion-prone substrate and on which substrate surface is present a coherent protective layer of an anti-corrosion composition which comprises a solid matrix of electrical conductivity $\geq 10^{-6}$ mho cm$^{-1}$ and formed by reaction between at least one water-soluble Bronsted acid, preferably a homo- or copolymer of an unsaturated Bronsted acid, and at least one Lewis base in which matrix is incorporated, preferably particulate, elemental metal, or an alloy thereof, the matrix and metal being effective in service as electrolyte and sacrificial anode, respectively. That is to say, this invention provides a method of coating a body comprising corrodible material with a solid electrolyte galvanic half-cell; and to a body so coated.

While the body having the substrate surface may have small dimensions, the present invention is of particular advantage in its application to bodies of large dimension, especially structural bodies as aforementioned. The term "body" as used herein may include bars, strips, sheets, rods, tubes and other cross-sections of solid or hollow stock as well as structures fabricated therefrom. The term "tube" as used herein may include any closed or open-ended elongate hollow stock of substantially constant cross-section, desirably with an axis of symmetry; for example elongate hollow stock of substantially constant circular, elliptical, square, rectangular or triangular cross-section.

The body may have one or more surfaces, which may be internally located surfaces, which comprise corrodible material. The or each such surface should have a coherent protective layer in accordance with the invention at least in the or each region which is in, or may come into, contact with a corrosive medium; for example, sea water. Desirably, all such surfaces should have a coherent protective layer as aforesaid over substantially their entire extent.

The corrodible material is usually electropositive metal and generally comprises substantially the entire surface. The invention is of particular, but not exclusive, relevance to a ferrous metal substrate surface; for example, a steel such as a structural steel.

The solid matrix is preferably hydrophilic in order to act in service (for example, in exposure to sea water) as an electrolyte. Good results are found to be obtained when the solid matrix comprises or, preferably, consists of, a cement.

The term "cement" as used herein means the coherent mass formed by reaction at a temperature below 250° C., preferably below 100° C., especially at ambient temperature, from at least one settable substance (but excludes covalently cross-linked organic thermoset materials) rather than the cement-forming component(s) themselves. It is desirable that the settable substance is capable of adhesively binding the, preferably particulate, elemental metal, or alloy thereof.

The cement is one in which at least one cement-forming component is a water-soluble Bronsted acid, preferably a homo- or copolymer of an unsaturated Bronsted acid, and at least one other cement-forming component is a Lewis base, preferably a Bronsted base.

By "Bronsted acid" is meant herein a substance which is a proton donor; by "Bronsted base" is meant herein a substance which is a proton acceptor. By "Lewis base" is meant herein an electron donor and includes a Bronsted base.

Such water-soluble Bronsted acids include a mineral acid, an acid salt, a polyfunctional carboxylic acid, a polyfunctional phenol, a homo- or copolymer of an unsaturated carboxylic acid, a homo- or copolymer of an unsaturated sulphonic acid, or a hydrolysable precursor thereof. The term "hydrolysable precursor" as used herein includes any species, such as an anhydride, an acid chloride or an acid amide, which is transformed on hydrolysis to the required acid cement-forming component. Suitable examples of mineral acids include phosphoric acids such as orthophosphoric acid, pyrophosphoric acid and meta-phosphoric acids, sulphuric acid, nitric acid and hydrohalic acids, such as hydrochloric acid, with phosphoric acids being preferred. Examples of acid salts include the hydrogen and dihydrogen phosphates, bisulphates, and bifluorides, especially the alkali metal hydrogen and dihydrogen phosphates. Examples of polyfunctional organic carboxylic acids and polyfunctional phenols include the following polybasic acids: malonic, mesoxalic, succinic, glutaric, adipic, pimelic, suberic, azeaic, sebacic, malic, citric, tartaric, tartronic, tricarbballylic, maleic, fumaric, citraconic, mesaconic, itaconic, glutaconic, muconic, aconitic, ortho-, iso- and tere-phthalic, gallic, tannic and mellitic acids, catechol, resorcinol, quinol, pyrogallol, hydroxyquinol and phloroglucinol. Other polyfunctional organic carboxylic acids and phenols which are not polybasic but are suitable as acid cement-forming components include hydroxycarboxylic acids and ketoacids. Examples are lactic, pyruvic, 2-hydroxyisobutyric, 2-hydroxycyclohexane carboxylic, 2-hydroxy-2-phenyl propionic, diphenylhydroxyacetic, 2-hydroxybenzoic, 3-hydroxybenzoic and 4-hydroxybenzoic acids, eugenol and salicylaldehyde. Examples of homo- or copolymers of an unsaturated carboxylic acid include those prepared by the homopolymerisation or copolymerisation of aconitic acid, acrylic acid, citraconic acid, fumaric acid, glutaconic acid, itaconic acid, maleic acid, mesaconic acid, methacrylic acid, muconic acid and tiglic acid, and the copolymerisation of these acids with other unsaturated aliphatic monomers for example vinyl monomers, such as vinyl hydrocarbon monomers, vinyl ethers, acrylamide or acrylonitrile. Particularly noteworthy are the homopolymers of acrylic acid and its copolymers particularly copolymers of acrylic acid and itaconic acid, especially those described and claimed in U.K. Pat. No. 1484454. Good results have also been obtained using a copolymer of vinyl methyl ether and maleic acid. Examples of homo- or copolymers of an unsaturated sulphonic acid include those prepared by the homopolymerisation or copolymerisation of ethylene sulphonic acid.

It is also possible to use a hydrolysable precursor of such polymers, for example a poly(carboxylic acid anhydride); furthermore, polyacrylic acids may be prepared by hydrolysis of corresponding polyacrylonitrile or anhydride. The hydrolysable precursor of a poly(carboxylic acid) may be a homopolymer of an unsaturated carboxylic acid or a copolymer with an abovementioned other carboxylic acid or anhydride thereof, or a copolymer of an unsaturated carboxylic acid anhydride with an unsaturated aliphatic monomer, for example vinyl monomers, such as vinyl hydrocarbon monomers, linear or cyclic vinyl ethers, acrylamide or acrylonitrile, for example pyran copolymer. Good results may be obtained by using homopolymers of maleic anhydride or vinyl orthophthalic anhydride, or copolymers thereof, especially, block copolymers thereof, with ethylene, propylene, butenes, styrene and vinyl methyl ether. Mixtures of such components may be used. Preferably, the acid cement-forming component is in aqueous solution.

It is to be understood, however, that both from the standpoints of availability and of good results, polyacrylic acid is the preferred Bronsted acid used in the formation of the solid matrix of this invention.

The cement is also formed from a base cement-forming component. At least a portion of Bronsted base may be replaced by a filler, suitably an inert filler as disclosed in GB No. 1504520; for example, a refractory such as a transition metal oxide, for example an iron oxide, or brick dust. Where all of the Bronsted base is replaced by a filler another Lewis base must be present. Suitable Lewis bases may include an elemental metal, or an alloy thereof; for example a portion of that elemental metal, such as zinc, or an alloy thereof, which in service acts as sacrificial anode. Such systems are of particular utility where an enhanced working time is required; for example, in brush coating loci of substantial area.

The cement is preferably formed from a base cement-forming component which comprises a basic or amphoteric oxide or hydroxide, or a salt of weak or volatile acid. There are many basic or amphoteric oxides or hydroxides which can form cements with at least one of the acid cement-forming components defined above; examples include $Li_2O$ (other Group IA oxides or hydroxides tend to give materials whicha re too soluble in aqueous media), Group IIA oxides, preferably calcined, such as $MgO$, "$Ti(OH)_4$", "$Zr(OH)_4$", $V_2O_5$, $Cu_2O$, $CuO$, $ZnO$, preferably calcined, $Al_2O_3 \times H_2O$ and $SnO_2$.

Salts of weak or volatile acids include carbonates, monocarboxylates, such as acetates and halides such as the halides of Mg, Ca, Ba, Th, Ti, Zr, Al and Sn. They also include extensive class of monomeric and polymeric (alumino)silicates, (alumino)phosphates and (alumino)borates which include the acid reactive natural and synthetic minerals and ion-leachable glasses. By "(alumino)silicate" is meant herein a silicate or an aluminosilicate; by "(alumino)-phosphate" is meant herein a phosphate or an aluminophosphate; by "(alumino)borate" is meant herein a borate or an aluminoborate. Examples of ion-leachable glasses include those glasses wherein the principal acidic oxide is silica (although the glass may also contain minor amounts of other anhydrides such as phosphorus pentoxide and boric oxide), and wherein the principal basic oxide in the glass is alumina which, although it has amphoteric properties, can be considered for the purposes of the present invention solely as a basic oxide. Such glasses include those from the systems $SiO_2$—$Al_2O_3$—$CaO$, $SiO_2$—$Al_2O_3$—$CaF_2$, $SiO_2$—$Al_2O_3$—$CaO$—$CaF_2$, $SiO_2$—$Al_2O_3$—$CaF_2$—$P_2O_5$ and $SiO_2$—$Al_2O_3$—$CaO$—$P_2O_5$. Particularly preferred glasses fall within the composition range of 10 to 65% w/w silica and 15 to 50% w/w alumina. The glass desirably contains at least one other basic oxide, preferably calcium oxide, which may be present in the glass composition in an amount from 0 to 55% w/w. The calcium oxide may be partly or wholly replaced by sodium oxide or other basic oxide or a mixture of basic oxides. The presence of sodium oxide can be desirable in increasing the solubility of the resulting cement. Preferred glasses for use in the present invention containing alumina, silica and calcium oxide are the gehlenite and anorthite glasses, and in general glasses falling within the composition range 10 to 65% w/w silica, 15 to 50% w/w alumina and 0 to 50% w/w calcium oxide.

Other galsses suitable for use in the present invention may contain fluoride, suitably up to 15% by weight, preferably less than 10% by weight. A class of fluoroaluminosilicate glasses particularly suited to this invention are those wherein the ratio by weight of silica to alumina is from 1.5 to 2.0 and the ratio by weight of fluorine to alumina is from 0.6 to 2.5 or wherein the ratio by weight of silica to alumina is from 0.5 to 1.5 and the ratio by weight of fluorine to alumina is from 0.25 to 2.0.

Other glasses include those disclosed in DE-OS No. 2750326 in J. Oral Rehabilitation, 10, pp 393-398 (1973); and in Ind. Eng. Chem. Prod. Res. Dev, 19 pp 263-270 (1980).

It is to be understood, however, that both from the standpoints of availability and of good results, zinc oxide is the preferred Bronsted base used in the formation of the solid matrix of this invention.

Mixtures of such components may be used.

It is noted that, apart from cement-forming components of unequivocal acidity or basicity, certain components may react as acid cement-forming components under a given set of reaction conditions while reacting as base cement-forming components under a different set of reaction conditions.

The elemental metal, or alloy thereof, should not only be more electropositive than the corrodible material but should also, in service, be able to function as a sacrificial anode. Where the corrodible material comprises ferrous metal the elemental metal, or alloy thereof, may be any metal with a standard electrode potential ($E_o$) at 25° C. less (greater negative value) than −0.44 volt. Examples include Mg, Ca, Al, Mn, Zn and alloys thereof including Mg/Al and Al bronzes, with Zn being the metal of choice in practice: Al appears to be passive while the other metals, in forms readily available, are too active. The elemental metal, or alloy thereof, may be particulate, including flake, fibrous or sheet in form. The average particle size of the elemental metal, or alloy thereof, is desirably in the range from 0.1μ to 100μ, preferably from 1μ to 50μ. Where their average particle size is below 0.1μ there are problems of availability; moreover, the particles tend to aggregate which has a deleterious effect on mixing. Where their average particle size is above 100 μ the integrity of the protective layer is impaired. An average particle size of from 5μ to 20μ is generally very suitable. For optimum effectiveness, it is generally desirable to incorporate as much of the elemental metal, or alloy thereof, into the solid matrix as is possible. It is preferred to incorporate at least 10% by weight of the weight of the protective layer and as much as 90% by weight can be incorporated with advantage.

It is also possible to form the elemental metal, or alloy thereof, and the glass cement-forming component as a cermet; for example, by mixing the two components; compressing the mixture and heating the compressed mixture in a vacuum furnace to prevent oxidation; and regrinding the frit so formed to the requisite particle size.

It is often desirable to incorporate into the matrix-forming mix an oxidant which appears to act as a depolarising agent; for example, manganese dioxide, permanganate, chromate, dichromate or bismuthate ion. This may have the effect of preventing gross evolution of hydrogen gas which can cause bubbles to form under the protective layer thereby causing its spalling. Typically, no more than 5% by weight of the elemental metal, or alloy thereof, of the oxidant need be present.

It is also often desirable, in order to enhance working time, especially in brush coating, to incorporate into the reactant mixture from which the matrix is formed a compound comprising at least one phosphorus-carbon or phosphorus-boron covalent bond such as boron phosphate. The compound preferably comprises at least one phosphonic acid group, or a salt thereof, in an amount effective in service to extend the working time of the composition. Preferably, the compound comprises a polybasic phosphonic acid. Particularly effective such compounds also comprise at least one other complexing group, suitably a hydroxyl or an amino, preferably a tertiary amino, group. It has been found that the materials sold under the trade mark "DEQUEST" ("DEQUEST" is a registered trade mark) are very suitable, especially:

N [CH$_2$ PO (OH)$_2$]$_3$   [(HO)$_2$ OP]$_2$ C(OH)CH$_3$ 2000                               2010

[(HO)$_2$ OP CH$_2$]$_2$N (CH$_2$)$_6$ N [CH$_2$ PO (OH)$_2$]$_2$

2041

[(HO)$_2$ OP CH$_2$]$_2$N CH$_2$ CH$_2$ N CH$_2$ CH$_2$ N [CH$_2$ PO (OH)$_2$]$_2$
                                            |
                                            CH$_2$ PO (OH)$_2$
2060

It is particularly desirable that the compound is soluble in, and preferably completely miscible in, an aqueous solution of the Bronsted acid.

In accordance with a further aspect of this invention it is often desirable to incorporate into the matrix-forming mix a further complexing agent soluble in an aqueous solution of the Bronsted acid. The complexing agent may comprise a fluoride ligand or, more preferably, a chelating agent. The chelating agent may comprise a plurality of carboxyl groups, for example aconitic, itaconic, maleic, mellitic or tricarballylic acid; it may also comprise at least one hydroxyl group. Particularly preferred such chelating agents comprise citric, malic or tartaric acid. A further suitable type of chelating agent comprises a multivalent metal chelate, for example a beta-diketone chelate, such as is formed by copper or zinc.

Such chelating agents are suitably present in an amount up to 20% by weight, preferably 0.1% or 10% by weight, especially 3% to 8% by weight, based on the weight of Bronsted acid.

This invention also comprises a process for fabricating a body as aforesaid, which process comprises mixing components which will form a solid matrix of electrical conductivy $\geq 10^{-6}$ mho cm$^{-1}$ together with an elemental metal, or an alloy thereof, as aforesaid; placing the mixture at a locus comprising a substrate surface which comprises corrodible material; and permitting the mixture to form a coherent protective layer of an anti-corrosion composition thereon. The mixture may be placed by brush coating it onto the locus or may be both mixed and placed by spray coating it onto the locus. The reactants may be spray coated consecutively or concurrently. Very suitable coatings have been prepared, using electrostatic spray guns ex Ransberg (UK) Ltd., Weybridge, Surrey by alternate spraying of, first, a pigment; for example of the composition:

6 parts zinc oxide;
6 parts zinc metal dust;
0.7 parts manganese dioxide (electrolyte powder)

and then a 25% by weight aqueous solution of polyacrylic acid ex Allied Colloids Ltd., Bradfor, W. Yorkshire. Adherent, hard, resistant coatings were produced in this manner. This invention further comprises a body whenever so fabricated.

In accordance with this invention, there is also provided a dry, intimate mixture of a basic or amphoteric oxide or hydroxide and an elemental metal, or alloy thereof, having a standard electrode potential ($E_o$) at 25° C. less than −0.44 volt, especially when comprising a phosphorus-containing compound as aforesaid. Such mixtures may also comprise at least one dry homo- or copolymer or an unsaturated Bronsted acid; for example, freeze-dried poly(acrylic acid).

The invention will now be illustrated by the following Examples.

EXAMPLE 1

6 g of zinc oxide powder (PolyF powder ex Dentsply Ltd.); 2 g of zinc metal dust (average particle size 7.5μ ex Goodfellow Metals Ltd.); and 2 g distilled deionised water were first mixed by spatulation on a glass slab to form a fine paste. 2 g of a 40% by weight aqueous solution of polyacrylic acid (Versicol E7 ex Allied Colloids Ltd.) of viscosity average molecular weight 30,000 were then blended into the fine paste and the resulting paste was immediately applied with a 1″ brush to a mild steel coupon 15 cm × 10 cm. Within minutes the coating so formed was observed to have set to a matt light grey coherent layer on the steel substrate.

EXAMPLE 2

Example 1 was repeated save that 4 g of zinc metal dust; 2 g of water and 2 g of the aqueous solution of polyacrylic acid were used.

EXAMPLE 3

2 g of zinc oxide powder (PolyF powder ex Dentsply Ltd.); 2 g of a zinc aluminosilicate glass having an average particle size of $10\mu$ and the composition, expressed in parts by weight, of ZnO (233); $SiO_2$ (206) and $Al_2O_3$ (70); 0.3 g of manganese dioxide; 2 g of zinc metal dust as used in Example 1; and 2 g of distilled deionised water were first mixed by spatulation on a glass slab to form a fine paste. 3 g of a 40% by weight aqueous solution of polyacrylic acid as used in Example 1 were then blended, and the resulting blend applied, as in Example 1.

EXAMPLE 4

Example 1 was repeated with the following formulation:
1 g willemite (average particle size less than $50\mu$);
1 g zinc metal dust;
1 g distilled deionised water;
0.1 g manganese dioxide;
1 g 40% by weight aqueous solution of polyacrylic acid.

EXAMPLE 5

Example 1 was repeated with the following formulation:
1 g ZnO (PolyF powder ex Dentsply Ltd.);
1 g zinc cermet powder (average particle size less than 45 $\mu$m);
1 g 40% by weight aqueous solution of polyacrylic acid.
1 g distilled deionised water;
0.1 g manganese oxide.

The zinc cermet powder was prepared from a blend of zinc metal dust (ex Goodfellow Metals) and a fluoraluminosilicate powder having the composition, expressed in parts by weight, of $SiO_2$ (100); $Al_2O_3$ (27.2) and $CaF_2$ (100). (3.1 weight/weight ratio), made by compressing the blend into a disc and heating in vacuo at 400° C. for 30 minutes.

EXAMPLE 6

Example 1 was repeated with the following formulation:
6 g ZnO (PolyF powder);
6 g zinc metal dust (7.5 $\mu$m, Goodfellow Metals);
2 g distilled deionised water;
2 g 50% by weight aqueous solution of polymaleic acid (ex Polysciences Ltd; average molecular weight 1,000);
0.7 manganese dioxide.

The blend formed an adhesive coating with a good finish; no disbonding in 3% NaCl solution was observed.

EXAMPLE 7

Example 6 was repeated with the following formulation:
6 g ZnO (PolyF powder);
6 g zinc metal dust (7.5 $\mu$m, Goodfellow Metals);
2 g distilled deionised water;
2 g 50% by weight aqueous solution of copolymer of acrylic acid and itaconic acid (2:1 copolymer "Chembond" liquid ex Dentsply Ltd.);
0.7 g manganese dioxide.

The blend formed an adhesive coating with a good finish; no disbonding in 3% NaCl solution was observed.

EXAMPLE 8

Example 6 was repeated with the following formulation:
6 g ZnO (PolyF powder);
6 g zinc metal dust (7.5 $\mu$m, Goodfellow Metals Ltd.);
2 g distilled deionised water;
2 g 40% by weight aqueous solution of polymethacrylic acid (ex Polysciences Ltd.);
0.7 g manganese dioxide.

The blend formed an adhesive coating with a good finish; no disbonding in 3% NaCl solution was observed.

EXAMPLE 9

Example 6 was repeated with the following formulation:
3 g ZnO (PolyF powder);
3 g Zn metal dust (Goodfellow Metals);
1 g 50% by weight aqueous solution of mellitic acid (ex BDH);
0.3 g manganese dioxide.

The blend dried to a matt finish; non-adherent to mild steel.

EXAMPLE 10

6 g of zinc oxide powder (polyF powder ex Dentsply Ltd.); 6 g of zinc metal dust (average particle size 7.5$\mu$ ex Goodfellow Metals Ltd.); and 2 g distilled deionised water were first mixed by spatulation on a glass slab to form a fine paste. 2 g of a 40% by weight aqueous solution of polyacrylic acid (Versicol E7 ex Allied Colloids Ltd.) of viscosity average molecular weight 30,000 were then blended into the fine paste and the resulting paste was immediately applied with a 1' brush to a mild steel coupon 15 cm×10 cm. Within minutes the coating so formed was observed to have set to a matt light grey coherent layer on the steel substrate.

EXAMPLE 11

In this Example, coated substrated prepared as in Examples 1 and 10 were each separately immersed in large glass beakers in a 3% by weight solution of sodium chloride (AnalaR grade) in distilled water: (sea water averages approximately 3% by weight of sodium chloride). The electrical potential of the coated steel substrates was each separately measured, using a voltmeter (Keithley Model 169 Multimeter) with a very high impedance (at least 10 Mohm), against a saturated calomel electrode. A comparative coated substrate (steel coated with GALVAFROID) and a control (steel with no coating) were likewise tested.

Measurements were regularly made over a test period of one month and it was found that in both samples where the substrate had been coated in accordance with this invention the electrical potential of the steel was less (greater negative value) than that in either the case of the comparative or the control samples.

Visual inspection of the samples during the test period showed that the samples where the substrate had been coated in accordance with this invention had resisted the corrosive effects of the saline solution much more effectively: their surfaces were still matt grey and there was substantially less solid matter deposited in the glass beakers.

EXAMPLE 12

In this Example, coated substrates prepared as in Examples 1 to 10 but of the sizes 38 cm×25 cm and 30 cm×30 cm were subjected to field trials as MOD Portsmouth. Samples were tested by bolting to steel girder rigs mounted on shore (salt spray test) and at a sandbank (half tide test). Comparative samples coated with GALVAFROID were also tested. All samples were retrieved after 12 weeks. Visual inspection suggested that while both types of sample in both sites showed evidence of corrosion this was less pronounced where the substrate had been coated in accordance with this invention. Furthermore, where corrosion had occurred it was, in the case of substrates which had been coated in accordance with the invention, generally confined about striations which might have been the result of gross corrosion of the coating by solid matter dispersed in the sea water. In the case of the comparative samples corrosion was not so confined and was clearly much more pronounced.

EXAMPLE 13

In this Example, coated substrates prepared as in Examples 1 and 10 were subjected to a bend test (BS 3900 (Part E1)) using a 13 mm diameter cylindrical mandrel. In each case the samples passed the test.

EXAMPLE 14

A two component system of the following formulation was prepared:

Component A 6 g ZnO (PolyF powder)
6 g Zn metal dust (average particle size 7.5μ ex Goodfellow Metals Ltd.)
0.7 g $MnO_2$ (electrolytic grade)
2 g distilled deionised water

Component B 2 g "Chembond" liquid
0.5 g DEQUEST 2000 (ex Monsanto Ltd.)

Component A was blended together to form a paste which, in turn, was mixed with component B, at ambient temperature and humidity, by spatulation. A portion of the paste was then applied to a mild steel coupon as in Example 1; the remainder was tested for working time. It was found that the paste had a working time of 6.5 minutes but required curing for 12 to 16 hours on the coupon to ensure complete resistance to a 3% aqueous sodium chloride solution.

EXAMPLE 15

Example 14 was repeated except that mixing was effected at 4.5° C. and 50% RH, and the curing was effected for 24 hours. The working time of the resulting paste increased to 19 minutes. After 24 hours in a 3% aqueous sodium chloride solution at 4.5° C. the coated coupon was found to suffer slight loss of material.

EXAMPLE 16

Example 14 was repeated except that mixing was effected at 25° C. and 100% RH. The working time of the resulting paste was 11.25 minutes. After curing for 24 hours on the coupon the coating was found to be resistant to a 3% aqueous sodium chloride solution. No corrosion was observed during 5 days immersion of the coated coupon in the solution.

EXAMPLE 17

Example 14 was repeated except that 3 g of the zinc oxide was replaced by 3 g of boron phosphate (ex Alfa Organics Ltd.). The working time of the resulting paste was 16.3 minutes. After curing for 24 hours on the coupon the coating was found to be resistant to a 3% aqueous sodium chloride solution. No corrosion was observed during 6 days immersion of the coated coupon in the solution.

EXAMPLE 18

Example 17 was repeated except that the boron phosphate was replaced by 3 g of brick dust (ex London Brick Co. Ltd.; No. 12 particle size <45μ). The working time of the resulting paste was 4 minutes. After curing for 24 hours on the coupon the coating was found to be resistant to a 3% aqueous sodium chloride solution. No corrosion was observed during 6 days immersion of the coated coupon in the solution.

EXAMPLE 19

A two component system of the following formulation was prepared:

Component A 5 g brick dust (ex London Brick Co. Ltd.; No. 12)
6 g Zn metal dust (average particle size 7.5μ ex Goodfellow Metals Ltd.)
0.7 g $MnO_2$ (electrolytic)
4 g distilled deionised water

Component B 2 g "Chembond" liquid

Component A was blended together to form a paste which, in turn, was mixed with component B, at 23±2° C. and 50±% RH, by spatulation. A portion of the paste was then applied to a mild steel coupon as in Example 1; the remainder was tested for working time. It was found that the paste had a working time of 30 minutes but required curing for 24 hours on the coupon to ensure complete resistance to a 3% aqueous sodium chloride solution.

EXAMPLE 20

Example 19 was repeated except that component A additionally comprised 0.92 g dry "Chembond" powder and component B comprised 5.08 g of water. The working time of the resulting paste was 5 minutes.

EXAMPLE 21

Example 17 was repeated except that the boron phosphate was replaced by calcined ferric oxide (ex BDH Ltd.). The working time of the resulting paste was 4 minutes. After curing for 24 hours on the coupon the coating was found to be resistant to a 3% aqueous sodium chloride solution. No corrosion was observed during 5 days immersion of the coated coupon in the solution.

EXAMPLE 22

A two component system of the following formulation was prepared:

Component A 5.6 g calcined Fe$_2$O$_3$ (ex BDH Ltd.)
Zn metal dust (average particle size 7.5μ ex Goodfellow Metals Ltd.)
0.7 g MnO$_2$ (electrolytic)
4.0 g distilled deionised water

Component B 2 g "Chembond" liquid

A paste was prepared from the components and tested as in Example 14. The working time of the resulting paste was 90 minutes. After curing for 24 hours on the coupon the coating was found to be resistant to a 3% aqueous sodium chloride solution. No corrosion was observed during 14 days immersion of the coated coupon in the solution.

EXAMPLE 23

A two component system of the following formulation was prepared:

Component A 10.4 g micaceous Fe$_3$O$_4$ (ex MIOX)
6.0 g Zn metal dust (average particle size 7.5μ ex Goodfellow Metals Ltd.)
4.0 g distilled deionised water

Component B 2 g "Chembond" liquid

A paste was prepared from the components and tested as in Example 19. The working time of the resulting paste was 14 minutes. Slight corrosion was observed at the coupon edge after 7 days.

EXAMPLE 24

A two component system of the following formulation was prepared:

Component A 5.6 g calcined Fe$_2$O$_3$ (ex BDH Ltd.)
6.0 g Zn metal dust (average particle size 7.5μ ex Goodfellow Metals Ltd.)
0.92 g solid poly(acrylic acid) (VERSICOL E7 $\overline{M}$=30,000 ex Allied Colloids Ltd.)
0.13 g borax (Fisons AR grade)
0.10 g NaH$_2$PO$_4$.2H$_2$O (Fisons AR grade)

Component B 5.08 g distilled deionised water

A paste was prepared from the components and tested as in Example 19. The working time of the resulting paste was 34 minutes. After curing for 24 hours on the coupon the coating was found to be resistant to a 3% aqueous sodium chloride solution. No corrosion was observed during 2 days immersion of the coated coupon in the solution.

EXAMPLE 25

Example 24 was repeated except that the borax and sodium dihydrogen phosphate was replaced by 0.23 g of boron phosphate. The working time of the resulting paste was 4.7 minutes.

EXAMPLE 26

Example 24 was repeated except that the borax and sodium dihydrogen phosphate was replaced by 0.23 g of boric acid. The working time of the resulting paste was 5.25 minutes.

EXAMPLE 27

Example 24 was repeated except that 0.23 g of borax was used and the sodium dihydrogen phosphate was omitted. The working time of the resulting paste was 8.50 minutes.

EXAMPLE 28

Example 24 was repeated except that 0.23 g of sodium dihydrogen phosphate dihydrate was used and the borax was omitted. The working time of the resulting paste was 44 minutes. After curing for 24 hours on the coupon the coating was found to be resistant to a 3% aqueous sodium chloride solution.

EXAMPLES 29 TO 35

A two component system of the following formulation was prepared:

Component A 5.6 g calcined Fe$_2$O$_3$ (ex BDH Ltd.)
6.0 g Zn metal dust (average particle size 7.5μ ex Goodfellow Metals Ltd.)
0.2 g MnO$_2$ (electrolyte)
4.0 g distilled deionised water

Component B 2.0 g of the polyacid shown in Table 1, the amount taken being such that the quantities of acid and of water in the formulations were the same in each example.

A paste was prepared from the components and tested as in Example 14. The working time and corrosion resistance of coupons coated with the paste and determined after curing for 24 hours on the coupon are shown in Table 1.

TABLE 1

| Example No. | Acid | Working Time | Performance in 3% NaCl solution |
|---|---|---|---|
| 29 | Chembond | 34 | Stable; no corrosion over 17 days |
| 30 | 50% PAA[1]; $\overline{M}$ = 5,000 (ex Aldrich) | 31 | Stable; waterline discolouration after 17 days |
| 31 | 25% PAA; $\overline{M}$ = 90,000 (ex Aldrich) | 5.3 | Cracking and blistering after 24 hours |
| 32 | Versicol E7 | 10 | Blistering after 4 days immersion |
| 33 | Versicol E9[2] | 6.25 | Unworkable |
| 34 | Poly F | 10.5 | No corrosion after 17 days |
| 35 | Versicol E5[3] | 15.5 | Waterline discolouration after 17 days |

[1]poly(acrylic acid)
[2]$\overline{M}$ = 75,000
[3]$\overline{M}$ = 3,500

EXAMPLES 36 TO 40

A two component system of the following formulation was prepared:

Component A 5.6 g calcined Fe$_2$O$_3$ (ex BDH Ltd.)
6.0 g Zn metal dust (average particle size 7.5μ ex Goodfellow Metals Ltd.)
0.7 g MnO$_2$ (electrolytic)

0.92 g dry polyacid powder (see Table 2)
0.23 g Na $H_2PO_4.2H_2O$

Component B 5.08 g distilled deionised water

A paste was prepared from the components and tested as in Example 14. The working time and corrosion resistance of coupons coated with the paste and determined after curing for 24 hours on the coupon are shown in Table 2.

TABLE 2

| Example No. | Acid | Working time | Performance in 37% NaCl solution |
|---|---|---|---|
| 36 | Chembond | 83 | Slight corrosion after 2 days |
| 37 | Versicol E5 | 70 | " |
| 38 | Versicol E7 | 66 | Slight corrosion after 6 days |
| 39 | Versicol E9 | 37.5 | Good resistance over 6 days |
| 40 | Poly F | 41 | " |

EXAMPLES 41 TO 45

Example 29 was repeated except that the given zinc powder was replaced by that shown in Table 3 which also shows the working time and corrosion resistance of coupons coated with the paste and determined after curing the 24 hours on the coupon.

TABLE 3

| Example No. | Zinc | Working Time | Performance in 3% NaCl solution |
|---|---|---|---|
| 41 | ex BDH Ltd. A.R. grade | 12.75 | Stable; no corrosion over 17 days |
| 42 | ex Hopkins and Williams L.R. grade | 4.75 | Stable; no corrosion over 20 days |
| 43 | 6 to 9μ ex ISC Alloys | 33 | Slight corrosion after 16 days |
| 44 | 4.5 to 6μ ex ISC Alloys | 10.5 | Slight corrosion after 16 days |
| 45 | 2.5μ ex Durham Chemicals | 8 | No corrosion over 4 days |

EXAMPLES 46 TO 50

Example 36 was repeated except that the sodium dihydrogen phosphate was replaced by the additive shown in Table 4 which also shows the working time and corrosion resistance of the coupons coated with the paste and determined after curing for 24 hours on the coupon.

TABLE 4

| Example No. | Additive | Working Time | Performance in 3% NaCl Solution |
|---|---|---|---|
| 46 | Dequest 2000$^x$ | 92 | Local attack at waterline after 5 days |
| 47 | Dequest 2010$^x$ | 59 | Local attack at waterline after 5 days |
| 48 | Dequest 2060$^x$ | 88 | No corrosion over 6 days |
| 49 | Sodium tripolyphosphate (ex Alfa) | 45 | Slight attack after 6 days |
| 50 | $Na_3PO_4.12H_2O$ (ex Fisons) | 48 | Slight attack after 6 days |

$^x$0.46 g as 50 m/m solutions

EXAMPLES 51 TO 53

Example 36 was repeated except that the acid used throughout was dried Versicol E7 and that the given zinc powder was replaced by the additive shown in Table 5 which also shows the working time and corrosion resistance of coupons coated with the paste and determined after curing for 24 hours on the coupon.

TABLE 5

| Example No. | Zinc powder | Working Time | Performance in 3% NaCl Solution |
|---|---|---|---|
| 51 | ISC alloys:SP | 50 | Stable; attack at waterline after 12 days |
| 52 | 8μ ex Durham Chemicals | 43 | Stable; attack at waterline after 12 days |
| 53 | 6μ ex Durham Chemicals | 29 | Stable; spot corrosion at waterline after 12 days |

EXAMPLES 54 AND 55

Example 51 was repeated except that the sodium dihydrogen phosphate was replaced by the additive shown in Table 6 which also shows the working time and corrosion resistance of coupons coated with the paste and determined after curing for 24 hours on the coupon.

TABLE 6

| Example No. | Additive | Working Time | Performance in 3% NaCl Solution |
|---|---|---|---|
| 54 | 0.46 g 50% M/M Dequest 2060$^x$ | 29 | Slight discolouration above waterline after 21 days |
| 55 | 0.46 g 50% glycerophosphoric acid (ex T. Morson) | 13 | Corrosion at waterline at 21 days |

$^x$4.85 g of water was added in each case

EXAMPLES 56 TO 65

Example 38 was repeated except that the zinc metal dust used was ISC SP and that chelating acids, added as solids at 5% m/m of the Versicol E7, were added as shown in Table 7 which also shows the working time and corrosion resistance of coupons coated with the paste and determined after curing for 24 hours on the coupon.

TABLE 7

| Example No. | Chelating Acid | Working Time | Performance in 3% NaCl Solution after 15 Days |
|---|---|---|---|
| 56 | D(+) tartaric | 60 | No apparent corrosion |
| 57 | meso-tartaric | 52 | Trace of white deposit |
| 58 | maleic | 47 | Spot corrosion |
| 59 | succinic | 52 | Corrosion apparent |
| 60 | diglycolic | 70 | Some corrosion at waterline |
| 61 | ketomalonic | 51 | Corrosion at waterline |
| 62 | citric | 63 | Slight corrosion at waterline |
| 63 | oxalic | 61 | Corroded |
| 64 | glycolic | 65 | Corroded |
| 65 | mesaconic | 58 | Some corrosion |

EXAMPLE 66

A two component system of the following formulation was prepared:

Component A 6 g zinc oxide (Poly F)
6 g zinc powder (average particle size 7.5μ ex Goodfellow Metals Ltd.)
0.7 g $MnO_2$ (electrolytic)
2.0 g distilled deionised water Component B 2 g 40% Versicol E7

50% m/m Dequest solutions shown in Table 8 which also shows the working time and corrosion resistance of coupons coated with the paste and determined after curing for 24 hours on the coupon.

TABLE 8

| Dequest | Amount Added | Working Time (min) | Setting Time (min) | Stability in Water After Setting |
|---|---|---|---|---|
| 2000 | 0.5 g | 3.25 | 12 | Good |
|  | 1.0 g | 13.75 | ca. 60 | Poor |
|  | 1.5 g | 24.75 | ca. 90 | Too viscous to apply |
| 2060 | 0.5 g | <2 | <4 | — |
|  | 1.0 g | 2.5 | 4.25 | Good |
|  | 1.5 g | 8.5 | 20 | Slight solubility |
|  | 2.0 g | 23.25 | 50 | Poor |

The Example was effected under ambient conditions of temperature and relative humidity.

EXAMPLE 67

Example 56 was repeated except that component B comprises 3.82 g distilled water and 2.54 g of ca. 50% m/m dispension of a rubber which comprises a carboxylated styrene-butadiene copolymer (ex Enichem Elastomer Ltd.). Results are as follows:

| Rubber (Intex) | 3 mm mandrel bend test on tin-free steel substrate | Performance in 3% NaCl solution after 16 days mild steel substrate |
|---|---|---|
| 166 | No cracking: 25% could be scraped off the bent region. | No corrosion |
| 178 | Slight cracking: 50% could be scraped off the bent region. | Slight corrosion at waterline |
| 1478 | No cracking. Very small amount could be scraped off the bent region. | Slight corrosion |
| 1493 | No cracking: 75% detached on scraping from the bent region. | Slight corrosion |

EXAMPLE 68

Component A 3 g Zinc metal dust (ex ISC Alloys:SP)
0.46 g Poly(acrylic acid) (Versicol E7:solid)

Component B 1 g $H_2O$
Pot life 25 minutes.

EXAMPLE 69

Component A 3 g Zinc metal dust (average particle size 7μ ex Goodfellow Metals Ltd.)
0.46 g Poly(acrylic acid) Versicol E7:solid)

Component B 1 g $H_2O$
Pot life 25 minutes.

EXAMPLE 70

Component A 3 g Zinc metal dust (average particle size 7μ ex Goodfellow Metals Ltd.)
1 g Chembond Component B 0.54 g $H_2O$
Pot life 25 minutes.

EXAMPLE 71

Component A 3 g Zinc metal dust (ex ISC Allys:SP)
0.46 g Poly(acrylic acid) Versicol E7:solid)
0.35 g Manganese dioxide (electrolytic)

Component B 1 g $H_2O$
Pot life 13 minutes.

The amount of water used in formulating Examples 68 to 71 inclusive was lower than that in the other filled systems because of the lower solids.

The pot life of all the coatings was sufficient for good quality brush coatings to be prepared.

We claim:

1. A body having a substrate surface which comprises an electrically conductive corrodible material and on which substrate surface is present a coherent protective layer of an anti-corrosion composition which comprises a solid matrix of electrical conductivity $>10^{-6}$ mho $cm^{-1}$ and formed by reaction between a homo- or copolymer of an unsaturated carboxylic acid or a hydrolysable precursor thereof and at least one basic or amphoteric oxide or hydroxide in which matrix is incorporated an elemental metal, or an alloy thereof, the matrix and metal being effective in service as an electrolyte and sacrificial anode, respectively.

2. A body according to claim 1 wherein the substrate surface comprises ferrous metal.

3. A body according to claim 1 wherein at least a portion of the matrix is an inert filler.

4. A body according to claim 1 wherein the matrix also comprises a particulate (alumino)silicate, (alumino)phosphate or (alumino)borate glass.

5. A body according to claim 1 wherein the elemental metal is zinc.

6. A body according to claim 1 wherein the average particle size of the elemental metal, or alloy thereof, is from 0.1μ to 100μ.

7. A body according to claim 1 wherein the elemental metal, or alloy thereof, is present in an amount from 10% to 90% by weight of the weight of the protective layer.

8. A body according to claim 1 wherein the reactant mixture from which the matrix is formed comprises an oxidant.

9. A body according to claim 1 wherein the reactant mixture from which the matrix is formed comprises a compound comprising at least one phosphorus-carbon or phosphorus-boron covalent bond.

10. A body according to claim 9, wherein said compound comprises at least one complexing group provided by said phosphorus-carbon or said phosphorus-boron covalent bond and at least one other complexing group.

11. A body according to claim 10 wherein said other complexing group is an amine group.

12. A body according to claim 1, wherein the matrix is formed by reaction between zinc oxide and a homo- or copolymer of acrylic acid or a hydrolysable precursor thereof.

13. A body according to claim 1, wherein the matrix is formed by reaction between zinc oxide and polyacrylic acid.

14. A body according to claim 12, wherein the matrix further comprises a particulate (alumino)silicate, (alumino)phosphate or (alumino)borate glass.

15. A body according to claim 13, wherein the matrix further comprises a particulate (alumino)silicate, (alumino)phosphate or (alumino)borate glass.

* * * * *